United States Patent [19]

Duroux

[11] 4,047,098
[45] Sept. 6, 1977

[54] PROCESS AND A DEVICE FOR PROSPECTING THE OCEAN BED BY MEASURING ELECTROMAGNETIC FIELDS

[76] Inventor: Jean Duroux, 12, rue Flatters, 75005 Paris, France

[21] Appl. No.: 598,915

[22] Filed: July 24, 1975

[30] Foreign Application Priority Data

July 30, 1974 France .................................. 74.26465

[51] Int. Cl.² .............................................. G01V 3/08
[52] U.S. Cl. ................................................... 324/6
[58] Field of Search ................................ 324/1, 3, 6, 9

[56] References Cited

U.S. PATENT DOCUMENTS

| | | | |
|---|---|---|---|
| 2,652,530 | 9/1953 | Davidson | 324/6 |
| 3,020,470 | 2/1962 | Shawhan et al. | 324/3 |
| 3,052,837 | 9/1962 | Arbogast et al. | 324/3 |
| 3,182,250 | 5/1965 | Mayes | 324/9 X |
| 3,329,929 | 7/1967 | Burnett | 324/3 X |
| 3,361,957 | 1/1968 | Hings | 324/9 X |
| 3,490,032 | 1/1970 | Zurflueh | 324/3 X |
| 3,514,693 | 5/1970 | Cagniard | 324/9 X |
| 3,521,153 | 7/1970 | Moss | 324/6 |
| 3,548,299 | 12/1970 | Duroux et al. | 324/6 |
| 3,763,419 | 10/1973 | Barringer | 324/6 |
| 3,875,497 | 4/1975 | Madsen | 324/3 |
| 3,936,728 | 2/1976 | Ghosh et al. | 324/6 |

FOREIGN PATENT DOCUMENTS

| | | | |
|---|---|---|---|
| 678,765 | 1/1964 | Canada | 324/6 |
| 188,671 | 12/1922 | United Kingdom | 324/3 |

*Primary Examiner*—Gerard R. Strecker
*Attorney, Agent, or Firm*—Sughrue, Rothwell, Mion, Zinn and Macpeak

[57] ABSTRACT

The present invention relates to a process and a device for prospecting the ocean bed by measuring electromagnetic fields.

A loop 4 emitting electromagnetic rays is towed by its electricity supply cables 3. These cables are twisted and possess a sufficient cross section to reduce their electrical resistance. The loop per se has a low reactance owing to the low frequency which is used. The pick-ups for the components of the magnetic or electric fields, which make it possible to detect the variations in resistivity of the ground, are situated with the supply generator for the loop 4 on the boat 1.

The present invention is intended for use in prospecting for mineral resources situated under water and, more generally, for all geological studies carried out on ground covered by water.

13 Claims, 3 Drawing Figures

PROCESS AND A DEVICE FOR PROSPECTING THE OCEAN BED BY MEASURING ELECTROMAGNETIC FIELDS

BACKGROUND OF THE INVENTION

1. Field of the Invention

The present invention relates to a process for prospecting the ocean bed by measuring electromagnetic fields and to a device for implementing the process.

2. Description of the Prior Art

Attempts have been made to use methods such as those employed on land which are based on the existence of contrasts in electrical resistivity between the different materials forming the subsoil for prospecting for mineral resources situated under water, more particularly, below the ocean and, more generally, for all geological studies of ground covered by water. However, although these methods are commonly employed on land, many difficulties arise when they are employed on the water and hitherto these have prevented their widespread use.

If electrical dragging or sounding techniques using continuous current are employed, the high conductivity of sea water tends to shortcircuit the current injection electrodes which makes it impossible to carry out thorough investigations of the underlying soil formations.

The use of electromagnetic prospecting processes employing aircraft, which are generally employed on land, would be simple to implement and would enable vast areas to be covered rapidly but, once again, when these processes are used over the ocean it is necessary to overcome the problem of the conductive layer of water which forms an impassable screen for the rays at the frequencies employed which are relatively high.

To overcome this problem it was sought to use frequential electromagnetic sounding processes at very low frequency such as the magneto telluric process which employs natural emissions. However, the equipment required for this process is so complicated and the recording periods at a particular station are so long that the process is rendered so expensive and delicate that its practical application is extremely problematical.

With regard to electromagnetic sounding process employing a dipole emitting low frequency rays and a suitable receiver, simply the conversion of these devices to adapt them to marine prospecting conditions produces a number of difficulties: the difficulty of providing fixed stations, the need to use low frequencies which are not particularly compatible with the movement of a stationary ship or a ship moving at a given rate, the need to use two boats each time the distance between the emitter and the receiver is too great to be contained on a single boat and each boat requires its own equipment and at least one operator. In addition, these two boats would have to maintain a constant distance between one another and follow the same route. These operations are extremely difficult to carry out in practice.

SUMMARY OF THE INVENTION

The main object of the present invention is a process for prospecting the beds of rivers, lakes or the ocean using an electromagnetic emission and for measuring at least one component of the field obtained at a specific distance above the area to be prospected, characterized in that the electromagnetic emission is generated at the surface of the water, continuously and at a predetermined fixed frequency of 1-100Hz. The amplitude measurements of the selected component or components are also taken at the surface of the water. The emission and measurements are carried out during a single dragging movement.

It has been found that for any exploratory operations carried out where the depth of the water is less than about 10 meters and where the thickness of the ground to be prospected is less than 20 meters it is generally possible to mount at one end of a boat, which is preferably approximately 40 meters in length and constructed for the most part of materials which are not electrically conductive, an electromagnetic emitter such as a magnetic dipole consisting, for example, of windings supplied with an alternating sinusoidal current of a given frequency of 1-100 Hz and, at the other end, pick-ups for measuring the components of the electromagnetic field, for example, pick-ups for measuring the radial magnetic field components $Hx$ and vertical magnetic field components $Hz$ and/or those of the transverse electric field $Ey$ to very easily obtain sufficiently accurate information concerning the variations in the resistivities of the prospected sub-soil formations. Hitherto, this information could only be obtained after long waiting periods over the area to be prospected and with very expensive apparatus.

Another object of the invention is to provide a device for implementing this process without a boat of sufficient length to house both the emission and reception equipment and which can also be used when the depth of the layer of water and the depth of the ground to be prospected are greater than the above-indicated values. The device in question which consists of an electric or magnetic dipole and of pick-ups for the magnetic and/or electric components of the electromagnetic field thus produced is characterized in that the dipole is supported on floats on the surface of the water and is drawn by twisted electric cables supplied with alternating current from a boat which also comprises the pick-ups. The length of the cables is kept constant during the dragging operation.

In this way it is possible to use a simple and efficient device which enables the prospecting operation to be effected very rapidly even when it is wished to detect the variations in the resistivity of the ground over relatively deep and extensive areas. Only one operator is required on board a single ship for the purpose of controlling the emission and recording the measurements. This device also has the advantage of being extremely flexible as, by means of the twisted cables supplying and towing the dipole, it is also possible to extend or reduce the distance between the dipole and the measuring point and, consequently, to carry out a relatively extensive and precise analysis of the variations in resistivity. It should be noted, in particular, that the cables do not produce any disturbance of the field and that, if in the course of the prospecting operation, the unexpected presence of a high noise level were to cause a disturbance, the dipole could be brought closer to the boat by means of the twisted cable. In this way the distance between the emission and the receiver would be reduced and the level of the components of the field emitted would be considerably increased at the measuring point.

A further object of the invention is to reduce the diameter of the magnetic dipole which is used without increasing the power of the emitter by employing a loop consisting of a plurality of windings. The cross-section of the twisted supply cables is such that it is both sufficient to pull the dipole without any risk of breaking the cables and to provide a sufficiently low resistance of the loop and the supply cables. It is possible to increase the number of windings without producing an excessively high reactance of the loop by virtue of the fact that very low values are selected for the frequencies employed.

As a result, when the distance between the loop and the pick-ups is only slight, it is easy to install the loop and the pick-ups, respectively, at each end of a single boat. The loop is connected by means of a twisted cable to a current generator which is located with the measuring instruments and it can thus be controlled by a single operator. Likewise, when there is considerable distance between the loop and the pick-ups it is only necessary to use relatively small floats to keep the loop comprising a number of windings on the surface of the water.

Other objects, features and advantages of the present invention will be made apparent from the following detailed description of a non-limitative embodiment of a device for implementing the process according to the invention and one of its variants.

DESCRIPTION OF THE PREFERRED EMBODIMENT

Figure 1:
FIG. 1 is a diagrammatic view of a boat towing a magnetic dipole.

In the embodiment represented in FIG. 1 it is assumed that the boat 1 is not sufficiently large for there to be adequate distance between the point of emission of the electromagnetic field and the reception point. It is also too small to carry the emission loop 4. Accordingly, in the embodiment represented, the boat 1 comprises a unit 2 containing all the equipment shown in detail in FIG. 3 comprising all the monitoring elements and control currents relative to the emission of the electromagnetic field by the loop 4 and for measuring the components of the field to be analysed. The supply cables 3 of the loop 4 which consists of a cable comprising 25 windings, are also used to pull the loop. Any type of floats may be used to support the loop 4 on the surface of the water. As they do not form part of the invention per se, they have not been represented. Quite obviously, any number of floats may be provided and the shape of the loop, which is preferably circular, may be maintained by any known means.

When a dipole consisting of electrodes 5 projecting into the water, is used, the direction 15 of the twisted cables 3 is kept perpendicular to the direction 14 of the junction of the electrodes 5. In this case, a number of floats may be used between the electrodes 5. the distance between the electrodes is kept constant by a rigid support or by any other means. This distance varies between 1 meter and a few score meters.

Figure 3:
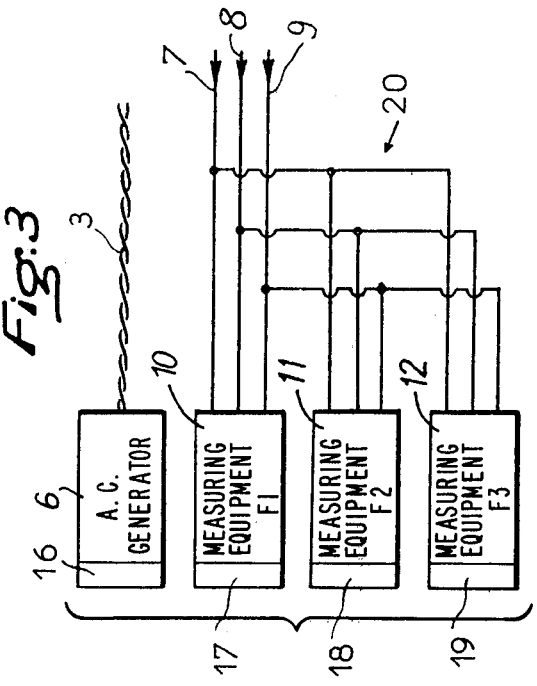
FIG. 3 shows the generating and receiving devices mounted on the boat.
Figure 2:
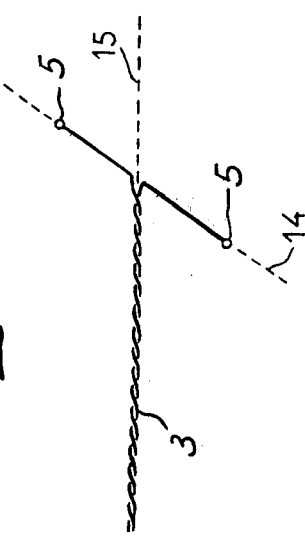
FIG. 2 is a diagrammatic view of a towed electric dipole.

The equipment which is used for the prospecting operation and which is designated by the general reference 2 in FIG. 1 is represented in diagrammatic form in FIG. 3. The reference number 6 designates the generator of alternating current supplying the loop 4 by means of the twisted cables 3. The pick-up for the transverse electric field Ey consists of two electrodes immersed in the water on either side of the boat. These have not been represented in 2 in FIG. 1 to simplify the drawing.

The pick-ups for the radial magnetic field Hx and the vertical magnetic field Hz have been represented diagrammatically by 7, 8 and 9 and the conventional measurement chains comprising amplification, filtering and recording stages for the frequency employed, by the block 10. The rectangles 16 and 17 are used to designate the monitoring and control means for the generator and the measuring equipment, respectively.

The device which has been described is particularly important because it can be used for the detection of variations in the resistivity of ground which is under water. It can also be used for determining the inclination of the magnetic field by measuring the ratio of the amplitudes or the phase difference of the magnetic field components Hx and Hx and for determining the surface impedance by measuring the ratio of the amplitudes or the phase difference between the transverse electric field component Ey and the component Hx. In the latter case, it has been found that more precise localization of the variations in the sub-soil is obtained without having to modify the device for the process which have been described.

If only a general indication of the position of resistivity variations is required, only one of the components Hx, Hz, Ey need be recorded. This may be effected by recording the variations in the mutual impedance between the electric or magnetic dipole 4 and the receiver at a virtually constant factor; the distance between the dipole 4 and the pick-ups 6, 7 or 8 and the level of emission being kept constant. In this way the operations are simplified to the extreme and the time required to effect the operations is reduced. The equipment used may also possibly be reduced, thereby considerably reducing the prospecting costs.

By way of example, the following values may be used as an indication of the possible characteristics of the tow device used to investigate under-water ground formations of up to about 100 meters in depth located beneath a water layer of some score meters in depth: Capacity of the current generator 6: 120 watts. Intensity in the emission loop 4 : 3.5 amperes Radius of the emission loop 4: 10 meters Number of windings in the emission loop 4 :10. Total resistance of the twisted cable 3 and of the emission loop 4 : 10 ohms. Total weight of the cable 3 and of the loop 4 : 26 kg. Maximum length of the twisted cable 3: 220 meters. Frequency employed: 10 to 100 Hz. Distance between the measuring electrodes 7 of the electric field Ey:10 meters Herebelow is a list of the electromagnetic field frequencies obtained with the above-described device for an ocean depth of several score meters, at a frequency of 10 Hz and with various possible distances between the emission loop and the measuring station.

| Distance | :50 Meters | :100 Meters | :200 Meters |
|---|---|---|---|
| Radial Magnetic Field | :1.10 mA/m | :450 uA/m | :100 uA/m |
| Vertical Magnetic Field | :7 mA/m | : 1 mA/m | :120 uA/m |
| Transverse Electric Field | :25 uV/m | : 5.4 uV/m | : 0.8 uV/m |

Details of another embodiment of a cable and loop device which has the same total resistance and can thus be used with the same emitting and receiving devices are provided hereafter. This unit is heavier and can be used for investigating deeper ground formations or ground situated beneath a deeper layer of water.

Radius of the emission loop : 20 meters

Number of windings: 10
Length of the twisted cable: 410 meters
Total weight of the cable and the loop: 88kg To prevent breaking of the cable when the device is used in very rough seas the section of the twisted cable will be increased to enable it to bear a more powerful pulling stress. This is not a disadvantage but an advantage in that it enables the electrical resistance of the cable to be reduced and a larger number of windings to be provided, thereby increasing the radiation capacity of the emitting dipole. In the embodiments which have been cited, sixteen windings can be used instead of ten when the section of the wire used for the twisted cable is increased tenfold.

According to the invention, a plurality of frequencies may be emitted simultaneously when it is wished to obtain a more complete sounding of the sea bed by obtaining soundings at different depths or when it is wished to take into consideration the considerable variations in the depth of the water within the perimeter of the prospected area.

This system eliminates the need to repeat the prospecting operation involving towing at a single frequency a corresponding number of times to the desired number of work frequencies. These operations are not only lengthy and costly but are very difficult to accomplish owing to the difficulties involved in following exactly the same course on the ocean on a number of occasions. Furthermore, duplication of the equipment can be avoided by only using a single emission source which does not emit a pure sinusoidal wave of F frequency but a wave with abundant harmonics, thereby enabling measurements to be taken both on the basic frequency and a plurality of harmonics. Accordingly, the generator 6 can inject into the dipole, which is used, a square wave of F frequency containing the uneven sinusoidal frequencies F, 3F, 5F, etc . . . Alternatively, it can inject disymmetrical saw tooth signals. The wave produced will then contain both even and uneven harmonics: F, 2F, 3F, 4F, 5F, etc . . .

In the embodiment represented in FIG. 3, there measurement chains are connected in parallel on each pick-up. Each chain 11 and 12 comprises amplification, filtering and recording stages as in the case of the chain 10. Filtering is effected to ensure that only frequencies F2 and F3, respectively, are received. The chain 10 is employed for reception of frequency F1. Conventional monitoring and control devices 18 and 19 are provided on each chain 11 and 12 and all the associated switching devices may be provided on the connection wires 30 to the pick-ups 7, 8 and 9. It is obvious that it would also be possible to employ only a single wide band measurement chain which is provided with a recording device. The recorded data would then be used after the prospecting operation for extracting the amplitudes and/or phases of the harmonics which it is desired to obtain by any conventional Fourier process of analysis.

Although the invention relates in particular to a process and a device employing sinusoidal frequencies of 1 – 100 Hz it is apparent that even lower frequences - below 1 Hz - can be used when employing a plurality of harmonics coming from a generator of non-sinusoidal waves. It would not constitute a departure from the scope of the invention to use the rapid interruption of a continuous current, more particularly, a continuous current having a very high intensity of 100 – 1000 amperes, for producing harmonics to enable investigations to be carried out at great depths. The signals emitted and received would advantageously be processed in the same manner on the ocean as on land.

In the latter case, when it is necessary to use extremely low wave frequencies - even lower than 1Hz - with extremely powerful emission outputs, the emitter operating with a square wave or saw tooth wave - or even the continuous emitter- is simpler and easier and less costly to produce than the sinusoidal emitter. The use of these emitters eliminates a serious disadvantage of soundings carried out at great depth, this being, the lengthy period of time taken to obtain these soundings which thus involves high operating costs. It is now possible to record a plurality of frequencies at one time. It is then simple to replay these at an accelerated cadence for the purposes of the Fourier analysis.

One embodiment consists of a 24 kW continuous generator capable of supplying a current of 100 amperes at 240 volts which is supplied to an emitting loop consisting of a single winding, 425 meters in diameter, consisting of a copper wire having a section of 10 mm$^2$, a total resistance equal to 2.4 ohms and weighing 160 kg. This generator can be used to supply a square wave by means of a single switching operation.

What is claimed is:

1. A process for prospecting the beds of rivers, lakes or the ocean by means of an electromagnetic emission and the measurement of at least one component of the field obtained at a specific distance above the area to be prospected, comprising the steps of generating a controlled electromagnetic emission continuously and at a predetermined frequency less than 100 Hz from a location at the surface of the water, and measuring the amplitude and phase of the selected component or components at the surface of the water at a location spaced a relatively great distance from the location of the electromagnetic emission, said component or components being either the transverse electric component Ey at the water surface or at least two components including the radial magnetic component Hx and either the vertical magnetic component Hz or the transverse electric component Ey, the steps of generating and measuring being carried out during a single dragging movement over the surface of the water while maintaining substantially the same distance between the generating and measuring locations.

2. A process as claimed in claim 1, wherein the step of generating the emission is performed simultaneously at a plurality of frequencies.

3. A process as claimed in claim 1, wherein the step of generating the emission is effected by producing a plurality of harmonics from the emission frequency.

4. A process as claimed in claim 1, wherein the traverse electric component Ey is measured and further comprising the step of recording the variations of this component as a general indication of the position of resistivity variations.

5. A process as claimed in claim 1, wherein the radial magnetic component Hx and the vertical magnetic component Hz are measured and further comprising the step of measuring the ratio of the amplitudes or the phase difference of these components to determine the inclination of the magnetic field.

6. A process as claimed in claim 1, wherein the radial magnetic component Hx and the transverse electric component Ey are measured and further comprising the step of measuring the ratio of the amplitudes or the phase difference of these components to determine the surface impedance.

7. A process as claimed in claim 1, wherein the radial magnetic component Hx, the vertical magnetic component Hz, and the transverse electric component Ey are measured and further comprising the steps of
recording the variations of one of the measured components as a general indication of the position of resistivity variations,
measuring the ratio of the amplitudes or phase difference of the radial magnetic component Hx and the vertical magnetic component Hz to determine the inclination of the magnetic field, and
measuring the ratio of the amplitudes of phase difference of the radial magnetic component Hx and the transverse electric component Ey to determine the surface impedance.

8. A device for prospecting the beds of rivers, lakes or the ocean by means of an electromagnetic emission and the measurement of at least one component of the field obtained at a specific distance above the area to be prospected, comprising:
an electric or magnetic dipole supported on floats on the surface of the water,
an alternating current generator mounted on a boat,
a plurality of twisted electric cables connecting the electric or magnetic dipole to the alternating current generator and the boat for supplying alternating current to the electric or magnetic dipole and dragging the dipole over the water behind the boat, the length of the cables being relatively great and constant during the dragging operation,
pick-ups mounted on the boat for detecting the magnetic and/or electric components produced as a result of the electromagnetic emission from the electric or magnetic dipole, and
means for measuring the amplitude and phase of the magnetic and/or electric components detected by said pick-ups.

9. A device as claimed in claim 8, wherein the magnetic dipole consists of a loop comprising 1 - 25 windings and that the cross-section of the twisted supply cables is sufficient both to pull the dipole without any risk of breaking the cables and to provide a sufficiently low resistance of the loop and the supply cables.

10. A device as claimed in claim 8, wherein the generator is a generator of alternating sinusoidal current having a frequency of less than 100 Hz.

11. A device as claimed in claim 8, wherein the generator has a frequency of less than 100 Hz produced a non-sinusoidal current with square waves or saw tooth waves or waves produced by the sudden interruption of a continuous current.

12. A device as claimed in claim 11, wherein said means for measuring comprises a plurality of the measurement chains connected in parallel to the pick-ups for the radial and vertical magnetic field components and transverse electric field component and each of the chains comprises a filtering stage at a predetermined frequency differing from chain to chain.

13. A device as claimed in claim 8, wherein the loop and the pick-ups are situated at a distance greater than double the desired investigation depth.

* * * * *